(12) United States Patent
Tsai et al.

(10) Patent No.: US 10,766,364 B2
(45) Date of Patent: Sep. 8, 2020

(54) VEHICLE DASHBOARD STRUCTURE

(71) Applicant: KWANG YANG MOTOR CO., LTD., Kaohsiung (TW)

(72) Inventors: Yi-Yang Tsai, Kaohsiung (TW); Nai-Kun Yeh, Kaohsiung (TW); Cheng-Tao Cheng, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 43 days.

(21) Appl. No.: 15/647,251

(22) Filed: Jul. 11, 2017

(65) Prior Publication Data

US 2018/0272866 A1 Sep. 27, 2018

(30) Foreign Application Priority Data

Mar. 22, 2017 (TW) .............................. 106204021 U

(51) Int. Cl.
| | |
|---|---|
| *B60K 35/00* | (2006.01) |
| *B60K 37/02* | (2006.01) |
| *B60K 37/04* | (2006.01) |
| *B62K 11/14* | (2006.01) |
| *B60K 37/06* | (2006.01) |
| *B62J 29/00* | (2006.01) |
| *B62J 50/20* | (2020.01) |

(52) U.S. Cl.
CPC .............. *B60K 35/00* (2013.01); *B60K 37/02* (2013.01); *B60K 37/04* (2013.01); *B60K 37/06* (2013.01); *B62K 11/14* (2013.01); *B60K 2370/139* (2019.05); *B60K 2370/151* (2019.05); *B60K 2370/52* (2019.05); *B60K 2370/65* (2019.05); *B60K 2370/654* (2019.05); *B60K 2370/68* (2019.05); *B60K 2370/685* (2019.05); *B60K 2370/70* (2019.05); *B60K 2370/777* (2019.05); *B60K 2370/91* (2019.05); *B60Y 2200/12* (2013.01); *B60Y 2200/126* (2013.01); *B62J 29/00* (2013.01); *B62J 50/20* (2020.02)

(58) Field of Classification Search
CPC ........ B60K 35/00; B60K 37/02; B60K 37/04; B60K 37/06; B62K 11/14
USPC ........................................................ 296/70
See application file for complete search history.

(56) References Cited

U.S. PATENT DOCUMENTS

| 6,407,663 B1 * | 6/2002 | Huggett ................. B60K 35/00 340/461 |
| 9,745,014 B2 * | 8/2017 | Osanai .................... B60K 23/02 |
| 9,783,258 B1 * | 10/2017 | Elwell ....................... B62L 3/06 |

\* cited by examiner

*Primary Examiner* — Joseph D. Pape
(74) *Attorney, Agent, or Firm* — Leong C. Lei

(57) ABSTRACT

A vehicle dashboard structure is provided. A steering unit of a vehicle is provided with a screen-included dashboard. The screen-included dashboard includes a screen-based display zone, which is operable to display different message modes. The steering unit includes a steering grip, which is provided with a control operator seat, which is provided with a control operator module that is operable to control the screen-based display zone for switching of the different message displaying mode. As such, one the one hand, switching of the display mode contents of the screen-based display zone is made easy to ensure riding safety of a rider, and on the other hand, the space of the control operator seat that is provided on the steering grip can be better used.

6 Claims, 12 Drawing Sheets

VEHICLE DASHBOARD STRUCTURE

TECHNICAL FIELD OF THE INVENTION

The present invention relates generally to a vehicle dashboard structure, and more particularly to a vehicle dashboard structure that makes switching of display mode contents of a screen display zone easy so as to ensure riding safety of a rider and to well use of a space of a control operator seat provided on a steering grip.

DESCRIPTION OF THE PRIOR ART

As shown in FIG. 1, for a vehicle, such as a motorcycle 1, to ensure riding safely and providing a rider with easy awareness of operation conditions of the vehicle 1, the vehicle 1 is often provided with a dashboard 12 mounted on a steering unit 11. The dashboard 12 functions to display information including velocity, engine speed, amount of fuel of the vehicle 1 to help the rider to control the vehicle 1 and also to improve riding safety of the vehicle 1.

As shown in FIG. 1, a conventional dashboard 12 comprises multiple pointer-based display zones 121 for displaying various operation conditions of a vehicle 1. The pointer-based display zone 121 of the dashboard 12 is operable to display only one type of information, and thus, the dashboard 12 is not provided with keys or buttons for switching among different ways or models of displaying. With the progress of science and technology, a dashboard 12 is no longer dependent on the ways of displaying operation conditions of a vehicle 1 by means of a pointer-based display zone 121 and, moreover, since photo-electronic display screens have been widely used for displaying of various messages, the dashboard 12 is also evolving with the progress of science and technology to involve photo-electronic display screens on the dashboard 12.

As shown in FIG. 2, photo-electronic display screens that are used in screen-included dashboard 12a for displaying operation conditions of a vehicle 1 have been widely used by vehicle manufacturers for being mounted on vehicles 1. In addition to a pointer-based display zone 121, the screen-included dashboard 12a also include multiple screen-based display zones 122. The screen-based display zones 122 are operable to display operation conditions in a digital way or based on images and pictures. In addition, the screen-based display zones 122 may be switchable, by means of a switch button 123 provided on an outside surface of the screen-included dashboard 12a, among different modes or contents of messages displayed on the screen-based display zones 122. More specifically speaking, each of the screen-based display zones 122 is capable of displaying at least two or more types of vehicle operation conditions or even other messages.

Although the screen-based display zones 122 of the screen-included dashboard 12a are capable of providing more message concerning riding conditions or other types of information for reference by the rider. To display different messages on a screen-based display zone 122 of the screen-included dashboard 12a, it requires an operation of the switch button 123 provided on the outside surface of the screen-included dashboard 12a to carry out switching. In other words, to switch the screen-based display zone 122 to displaying of messages in a different mode, one hand of the rider must move away from the steering unit 11 to touch and operate the switch button 123. This causes certain difficulty in switching the screen-based display zone 122 between different modes of displaying different messages and may also lead to concern about riding safety.

Thus, it is a challenge of the vehicle manufacturers to provide a vehicle dashboard structure that allows for easy switching of a screen-based display zone between different types of messages and also helps alleviate concern about riding safety.

SUMMARY OF THE INVENTION

The primary objective of the present invention is to provide a vehicle dashboard structure, which overcomes the drawback of difficulty of control of a conventional screen-included dashboard.

Technical Solution Solving the Problem

For such a purpose, the primary technical solution as claimed in claim 1 of this application is to provide a vehicle dashboard structure, wherein a steering unit of a vehicle is provided with a screen-included dashboard; the screen-included dashboard comprises at least one, or more, screen-based display zone; the screen-based display zone is operable to display different message modes; the steering unit comprises a steering grip; the steering grip is provided with a control operator seat; the control operator seat is provide with a control operator module that is operable to control the screen-based display zone to switch different message displaying modes.

For such a purpose, the primary technical solution as claimed in claim 2 of this application is to provide a vehicle dashboard structure, wherein the control operator module is electrically connected with the screen-included dashboard, and the control operator module comprises a mode switch operator, a display content selection operator, and a confirmation operator.

For such a purpose, the primary technical solution as claimed in claim 3 of this application is to provide a vehicle dashboard structure, wherein the screen-based display zone at least comprises a first screen-based display zone and a second screen-based display zone; the screen-included dashboard comprises a first screen-based display zone control unit and a second screen-based display zone control unit, wherein the first screen-based display zone is electrically connected with the first screen-based display zone control unit and the second screen-based display zone is electrically connected with the second screen-based display zone control unit; the control operator module comprises a mode switch operator, wherein the mode switch operator is operable to control the first screen-based display zone and the second screen-based display zone for switching different message displaying modes.

For such a purpose, the primary technical solution as claimed in claim 4 of this application is to provide a vehicle dashboard structure, wherein the screen-included dashboard comprises a first screen-based display zone control unit and a second screen-based display zone control unit; the screen-based display zone at least comprises a first screen-based display zone and a second screen-based display zone, wherein the first screen-based display zone is electrically connected with the first screen-based display zone control unit and the second screen-based display zone is electrically connected with the second screen-based display zone control unit; the control operator module is electrically connected with the first screen-based display zone control unit and the second screen-based display zone control unit; the mode switch operator is electrically connected with the second screen-based display zone; a reversal protection element is provided between the display content selection operator and the mode switch operator of the control operator module; a reversal protection element is provided between the confirmation operator and the mode switch operator and a resistance element is further electrically connected between the confirmation operator and the reversal protection element such that the control operator module operates the mode switch operator to control the first screen-based display zone or the second screen-based display zone for switching of display mode contents, and then uses the display content selection operator to select desired display mode contents, and finally uses the confirmation operator to cause the selected message displayed or to cause the selected control display mode contents to operate.

For such a purpose, the primary technical solution as claimed in claim 5 of this application is to provide a vehicle dashboard structure, wherein an upper surface of the screen-included dashboard is provided with a mode switch operator of the control operator module; the mode switch operator is electrically connected with the second screen-based display zone; a reversal protection element is provided between the display content selection operator and the confirmation operator of the control operator module and the mode switch operator and a resistance element is further electrically connected between the confirmation operator and the reversal protection element, such that the control operator module operates the mode switch operator to control the first screen-based display zone or for switching of display mode contents, and then uses the display content selection operator to select desired display mode contents, and finally uses the confirmation operator to cause the selected message displayed or to cause the selected control display mode contents to operate.

For such a purpose, the primary technical solution as claimed in claim 6 of this application is to provide a vehicle dashboard structure, wherein the first screen-based display zone control unit and the second screen-based display zone control unit are a logic circuit substrate.

For such a purpose, the primary technical solution of this application is to provide a vehicle dashboard structure, wherein the display content selection operator is a top-bottom switchable operator.

For such a purpose, the primary technical solution of this application is to provide a vehicle dashboard structure, wherein the display content selection operator is a dual-button logic operator.

For such a purpose, the primary technical solution of this application is to provide a vehicle dashboard structure, wherein the display content selection operator comprises a plurality of selection operators.

For such a purpose, the primary technical solution of this application is to provide a vehicle dashboard structure, wherein the screen-based display zone at least comprise a first screen-based display zone and a second screen-based display zone, wherein the first screen-based display zone or the second screen-based display zone, all or one of them, is mounted to a rearview mirror of the steering unit.

Efficacy of the Invention

The efficacy of the present invention that can be achieved with the technical solution of claim 1 is that the screen-included dashboard comprises at least one screen-based display zone; the steering grip of the steering unit is provided with the control operator seat; and the control operator seat is provided with the control operator module that is operable to control the screen-based display zone to switch different displaying messages, such that when a rider operates a first screen-based display zone or a second screen-based display zone for changing display mode contents, a hand of the rider does not need to move away from the steering grip and direct operation may be conducted with fingers to achieve the purpose of changing display mode content to thereby, on the one hand, make switching of display mode contents of the screen-based display zone easy to ensure riding safety and, on the other hand, well use the space of the control operator seat of the steering grip.

The efficacy of the present invention that can be achieved with the technical solution of claim 2 is to ensure controllability of the screen-included dashboard.

The efficacy of the present invention that can be achieved with the technical solution of claim 3 is to ensure controllability of the screen-included dashboard.

The efficacy of the present invention that can be achieved with the technical solution of claim 4 is to ease controllability of the screen-included dashboard.

The efficacy of the present invention that can be achieved with the technical solution of claim 5 is to ease controllability of the screen-included dashboard.

The efficacy of the present invention that can be achieved with the technical solution of claim 6 is to lower down cost of the screen-included dashboard.

The efficacy of the present invention that can be achieved with the technical solution is to ease the controllability of the control operator module.

The efficacy of the present invention that can be achieved with the technical solution is to ease the controllability of the control operator module.

The efficacy of the present invention that can be achieved with the technical solution is to ease the controllability of the control operator module.

The efficacy of the present invention that can be achieved with the technical solution is to ease observation of the rider.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
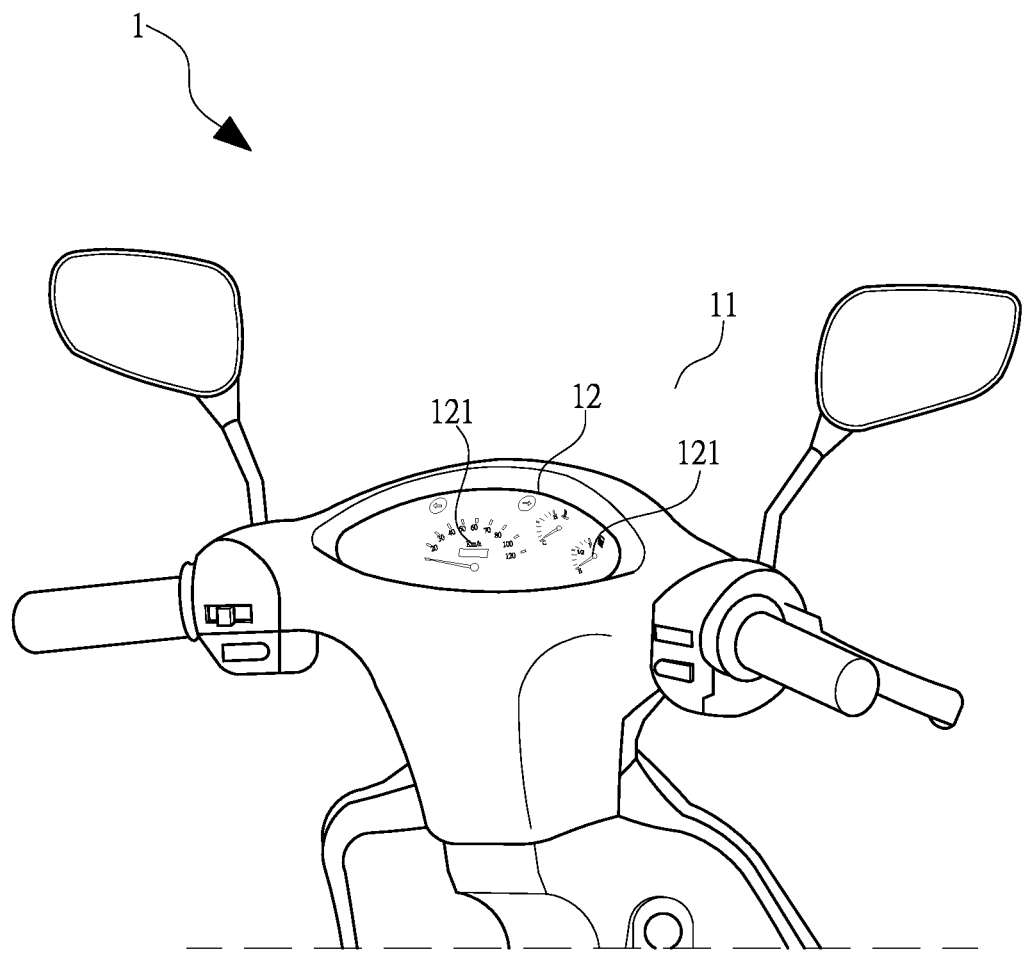
FIG. 1 is a schematic view illustrating a conventional vehicle dashboard.
Figure 2:
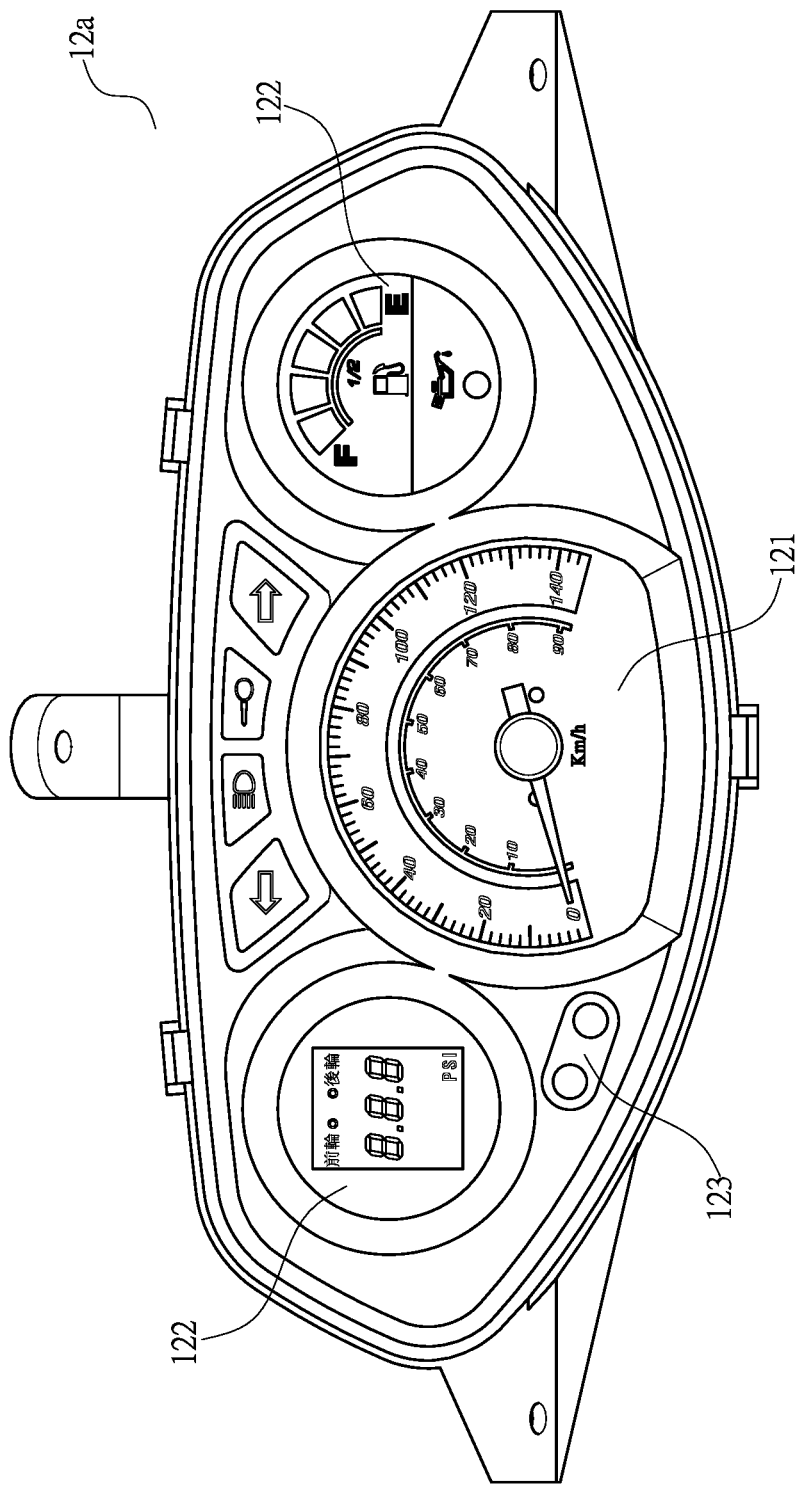
FIG. 2 is a schematic view illustrating another conventional vehicle dashboard.
Figure 3:
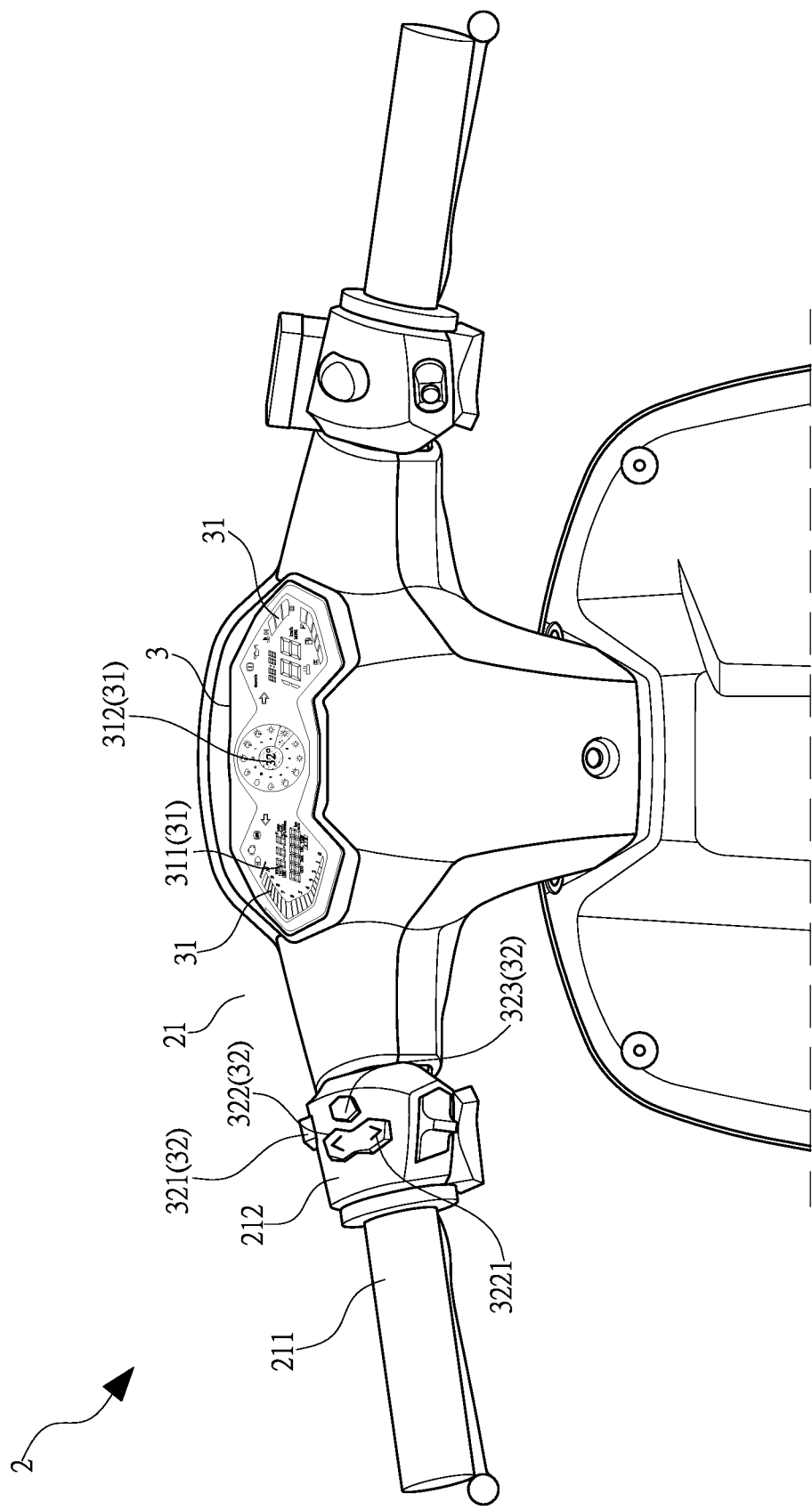
FIG. 3 is a schematic view illustrating a vehicle dashboard according to the present invention.
Figure 4:
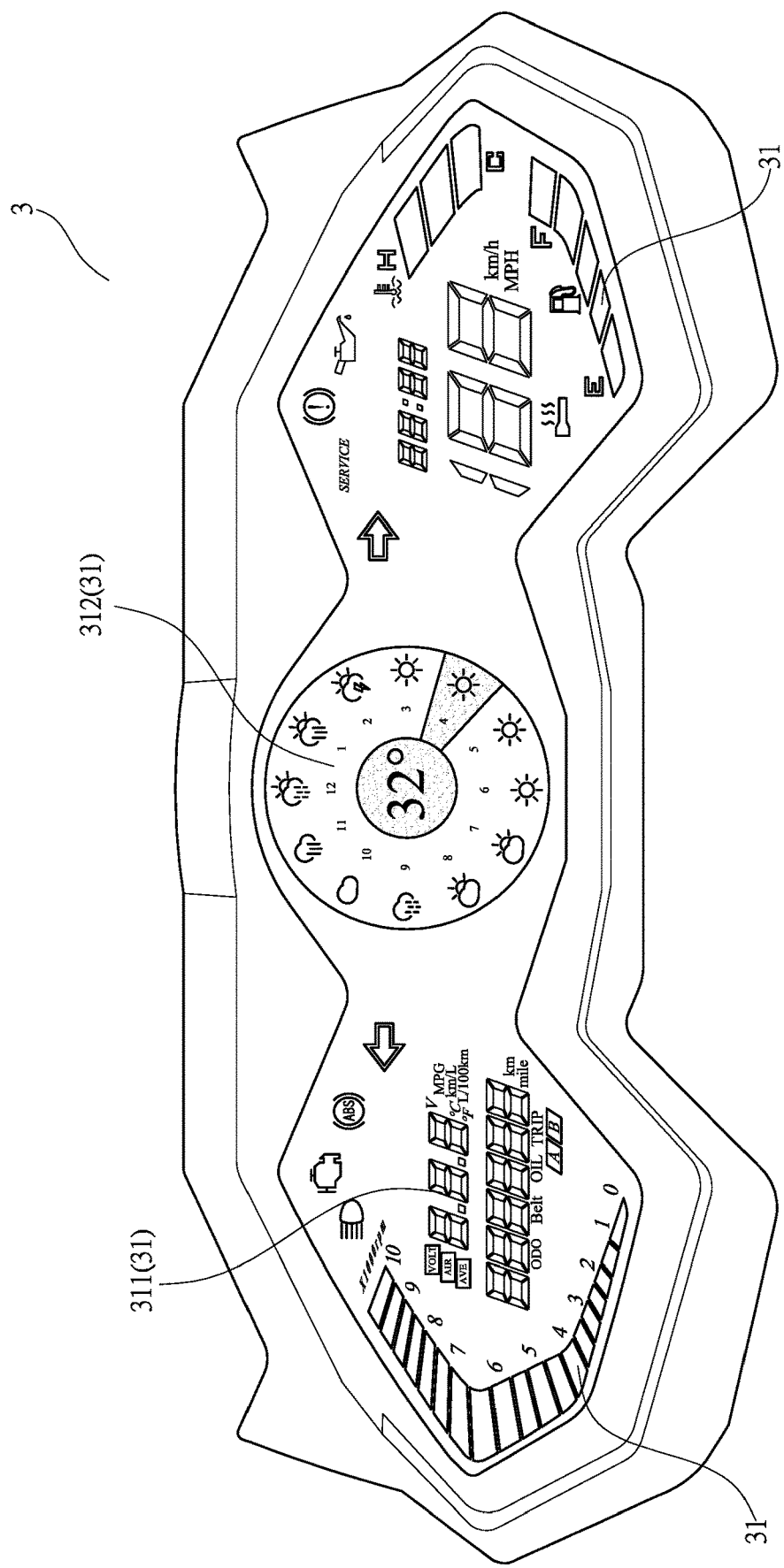
FIG. 4 is a front view of the vehicle dashboard of the present invention.

Firstly, referring to FIGS. 3 and 4, the present invention provides a structure of a dashboard for a vehicle. The vehicle 2 comprises a steering unit 21 on which a screen-included dashboard 3 is mounted. The screen-included dashboard 3 comprises at least one or more screen-based display zones 31. The steering grip 211 of the steering unit 21 is provided with a control operator seat 212. The control operator seat 212 is provided with a control operator module 32 that controls the screen-based display zones 31 to switch between modes for displaying different messages.

Figure 5:
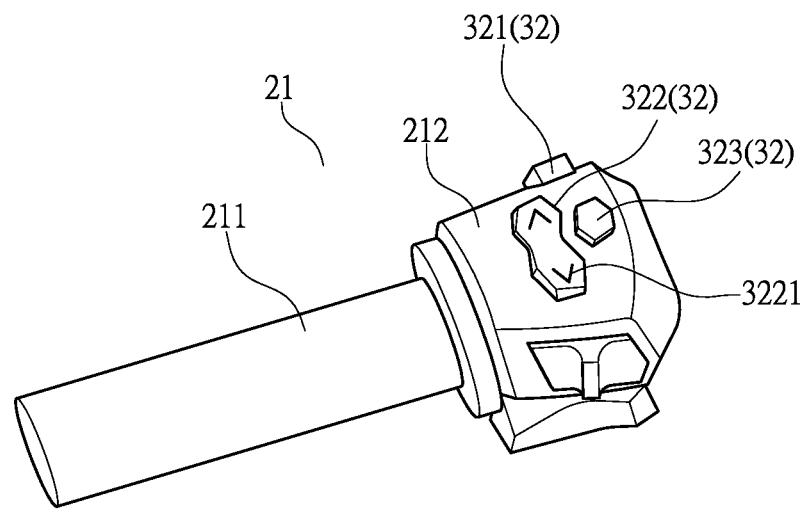
FIG. 5 shows a first embodiment of a control operator module of the vehicle dashboard of the present invention.

As shown in FIGS. 3, 4, and 5, the screen-included dashboard 3 comprises at least one screen-based display zone 31. A first embodiment of the present invention exemplify a plurality of screen-based display zones 31 for explanation and illustration, wherein at least two screen-based display zones 31 are provided for switchability for different message displaying modes, being respectively a first screen-based display zone 311 and a second screen-based display zone 312. The first screen-based display zone 311 may have control display modes, such as mileage displaying, seat cushion opening control, fuel tank lid opening control, foot rest bar opening control, front storage box cover opening control, hook opening control, and magnetic lock opening control; and the second screen-based display zone 312 may have display modes, such as clock, temperature displaying, rain/sunshine weather displaying, unanswered in-coming call displaying, and phone message displaying. The screen-included dashboard 3 is electrically connected with the control operator module 32 provided on the control operator seat 212 of the steering grip 211. The control operator module 32 comprises a mode switch operator 321, a display content selection operator 322, and a confirmation operator 323. The control operator module 32 can be mounted to the control operator seat 212 of the steering grip 211 on the left hand side or the right hand side.

As shown in FIGS. 3, 4, and 5, the mode switch operator 321 of the control operator module 32 is primary operable for switching display mode contents for the first screen-based display zone 311 or the second screen-based display zone 312 as switching of modes and contents of displaying. For example, when the mode switch operator 321 is not pushed, the first screen-based display zone 311 is operable for selection of displaying contents, and under this condition, a rider may use the display content selection operator 322 to select the desired control display mode contents, and then, use the confirmation operator 323 to cause the selected display mode contents to operate; when the mode switch operator 321 is pushed, the second screen-based display zone 312 is operable for switching displaying contents, and under this condition, the rider may use the display content selection operator 322 to select the desired control display contents, and then uses the confirmation operator 323 to cause the selected display mode contents to display.

Figure 6:
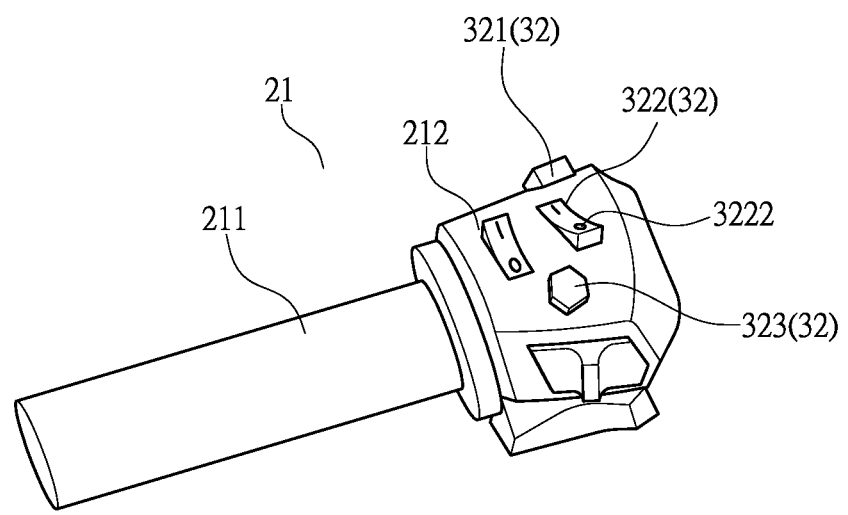
FIG. 6 shows a second embodiment of the control operator module of the vehicle dashboard of the present invention.

As shown in FIG. 5, the display content selection operator 322 of the control operator module 32 may comprise a top-bottom switchable operator 3221, such that the contents of a selected display mode can be switched through upward-downward pushing As shown in FIG. 6, the display content selection operator 322 of the control operator module 32 may alternatively comprise a dual-button logic operator 3222, such that the logic selection operator 3222 is operable in a logic way of combinations of 00, 01, 10, 11 to directly change the contents of the display modes that are desired to display.

Figure 7:
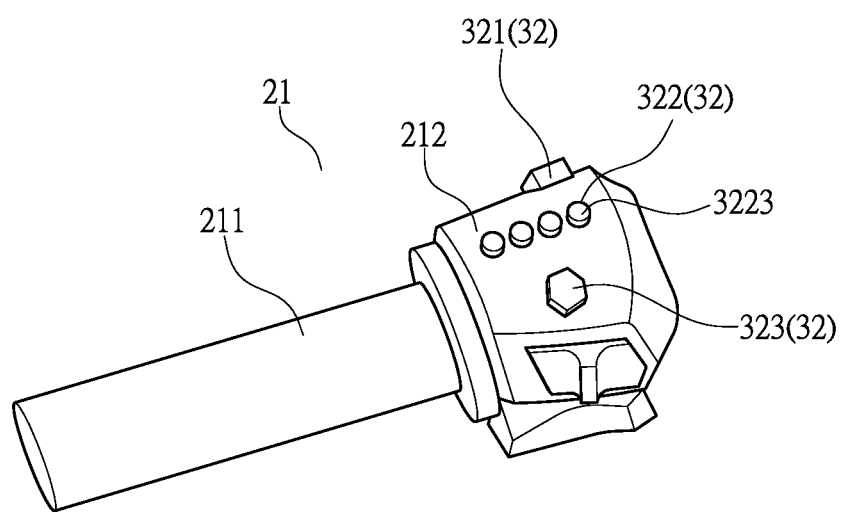
FIG. 7 shows a third embodiment of the control operator module of the vehicle dashboard of the present invention.
Figure 8:
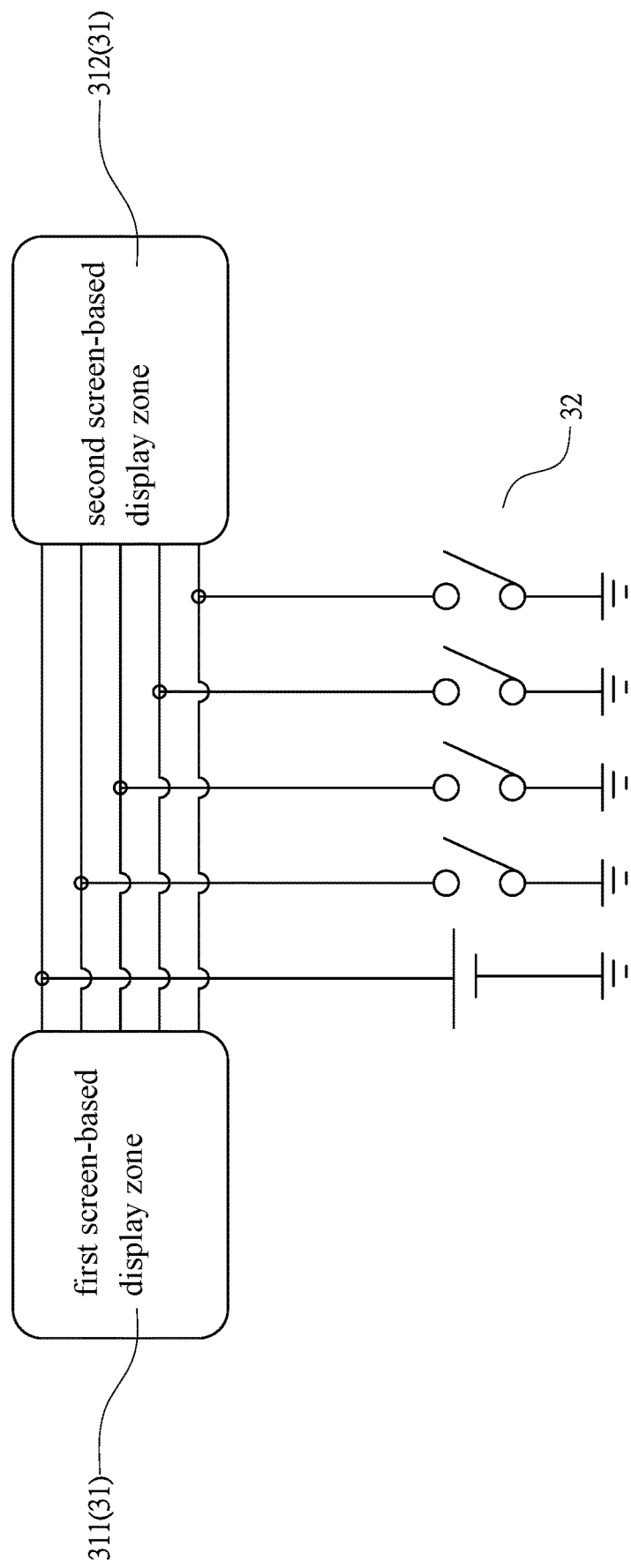
FIGS. 8 and 9 are schematic views illustrating control modes of the vehicle dashboard of the present invention.
Figure 9:
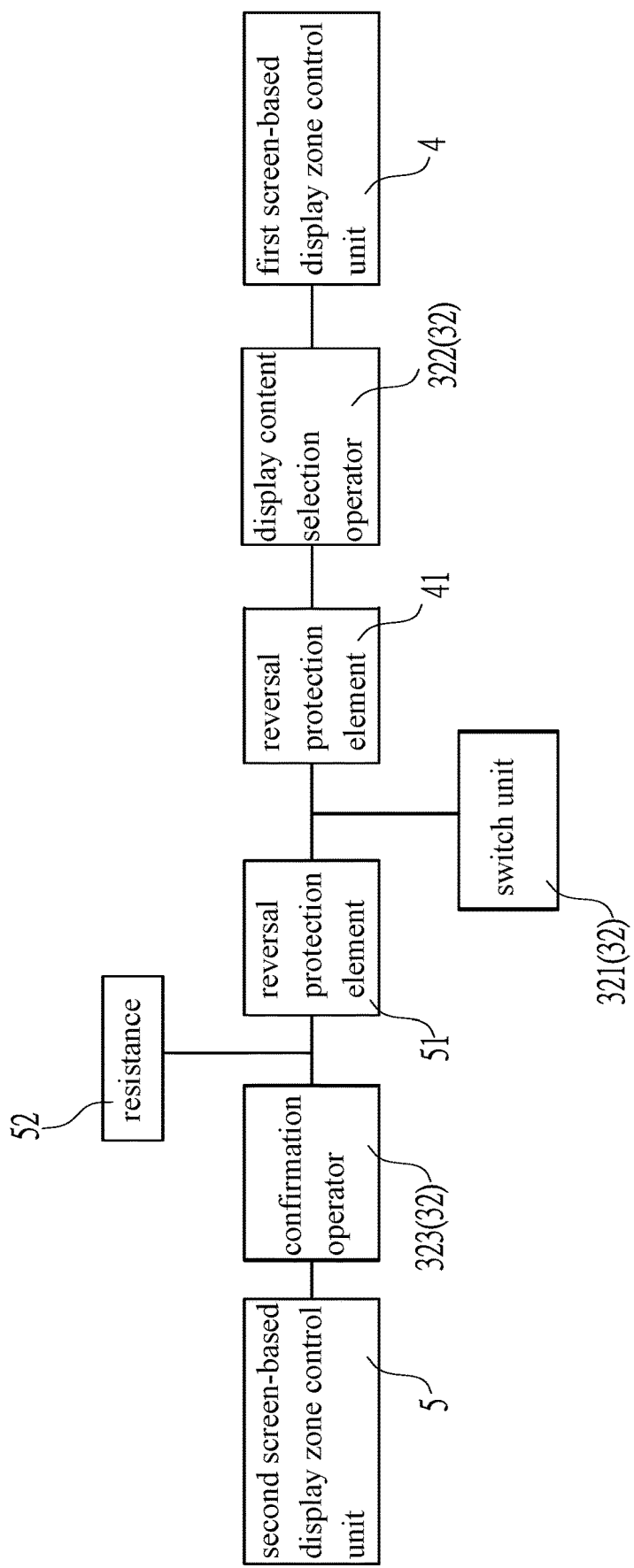

As shown in FIG. 7, the display content selection operator 322 of the control operator module 32 may alternatively comprise a plurality of selection operators 3223, such that the plurality of selection operators 3223 may be used to directly change the contents of the display modes that are desired to display.

As shown in FIGS. 4, 5, 6, 7, 8, and 9, the screen-included dashboard 3 comprises a first screen-based display zone control unit 4 and a second screen-based display zone control unit 5. The first screen-based display zone control unit 4 and the second screen-based display zone control unit 5 are a logic circuit substrate. The first screen-based display zone 311 is electrically connected with the first screen-based display zone control unit 4, and the second screen-based display zone 312 is electrically connected with the second screen-based display zone control unit 5. The control operator module 32 is electrically connected with the first screen-based display zone control unit 4 and a second screen-based display zone control unit 5. The mode switch operator 321 is electrically connected with the second screen-based display zone 312. A reversal protection element 41 is provided between the display content selection operator 322 of the control operator module 32 and the mode switch operator 321 in order to protect the display content selection operator 322. A reversal protection element 51 is also provided between the confirmation operator 323 and the mode switch operator 321 and a resistance element 52 is further electrically connected at a location between the confirmation operator 323 and the reversal protection element 51 so that damage of one of the confirmation operator 323 and the display content selection operator 322 would not influence the other one and thus, the confirmation operator 323 and the mode switch operator 321 can be protected. As such, the control operator module 32 may operate the mode switch operator 321 to control the first screen-based display zone 311 or the second screen-based display zone 312 for switching of display mode contents, and then uses the display content selection operator 322 to select the desired display mode contents, and finally, uses the confirmation operator 323 to cause the selected messages to display or to cause the selected control display mode contents to operate. As such, when the rider operates the first screen-based display zone 311 or the second screen-based display zone 312 for changing displaying contents, the rider's hands do not need to move away from the steering grip 211 and may conduct direct operation with fingers to achieve the purpose of changing displayed contents. As such, on the one hand, switching of the display mode contents of the screen-based display zones 31 is made easy to ensure riding safety of the rider, and on the other hand, the space of the control operator seat 212 provided on the steering grip 211 may be better used.

Figure 10:
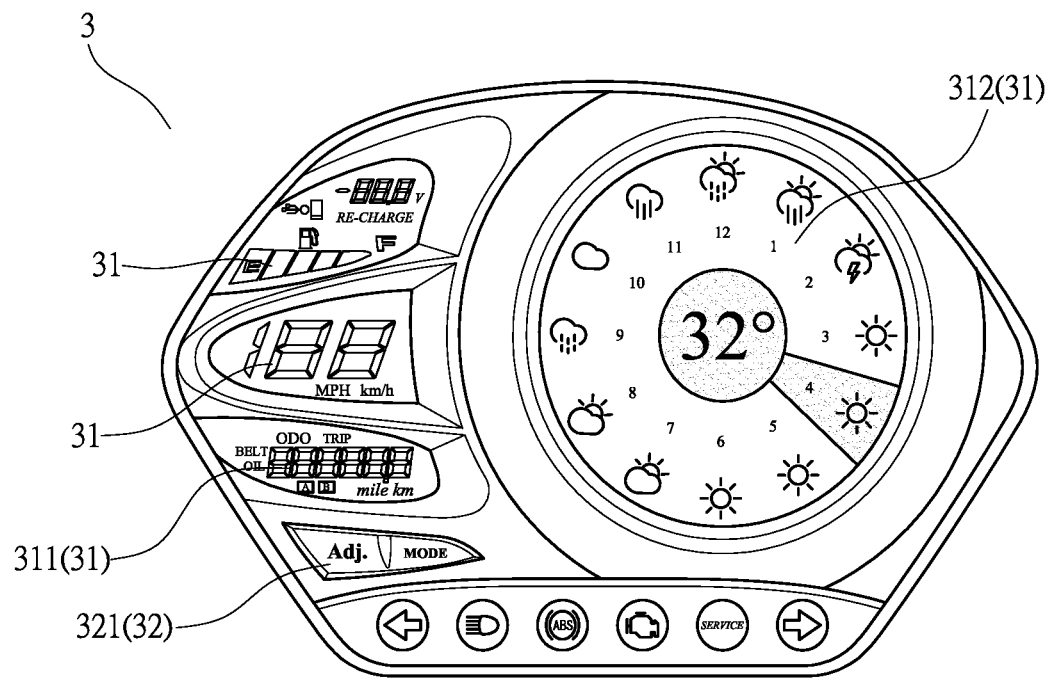
FIG. 10 shows another embodiment of the vehicle dashboard according to the present invention.
Figure 11:
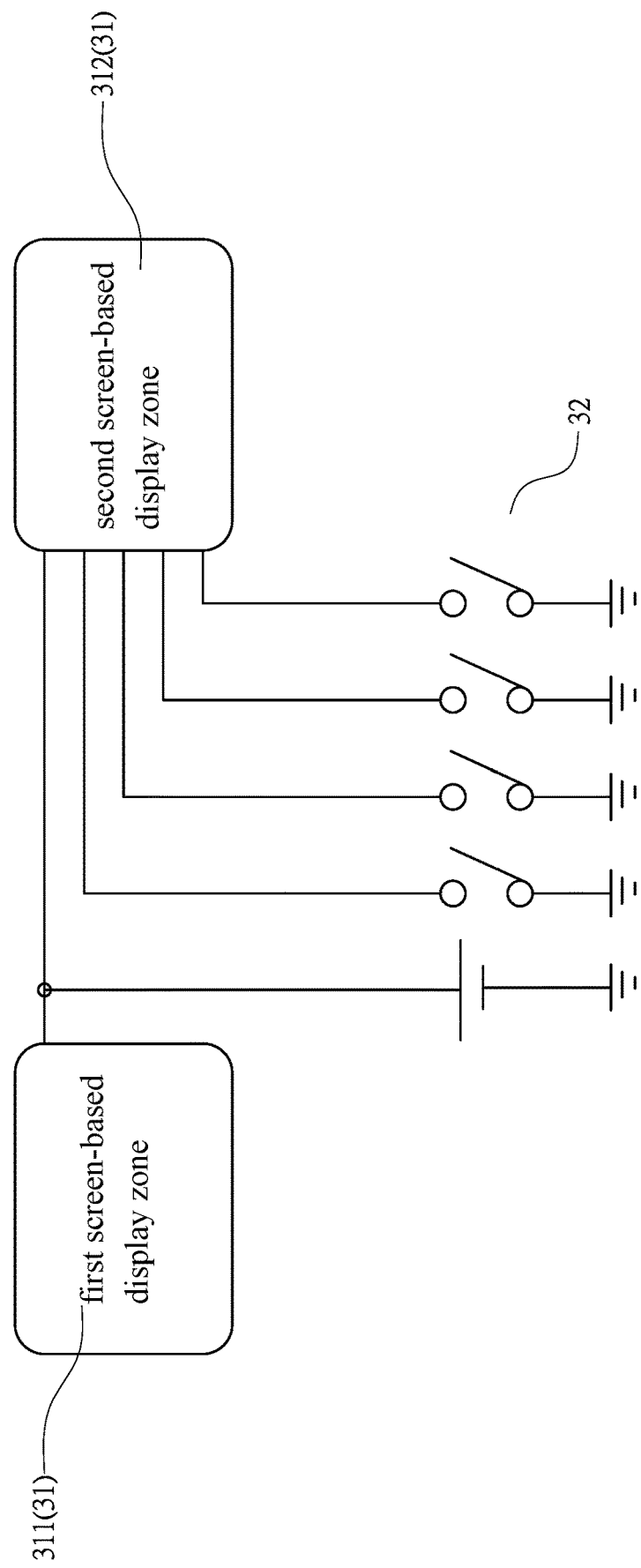
FIGS. 11 and 12 are schematic views illustrating control modes of said another embodiment of the vehicle dashboard of the present invention.
Figure 12:
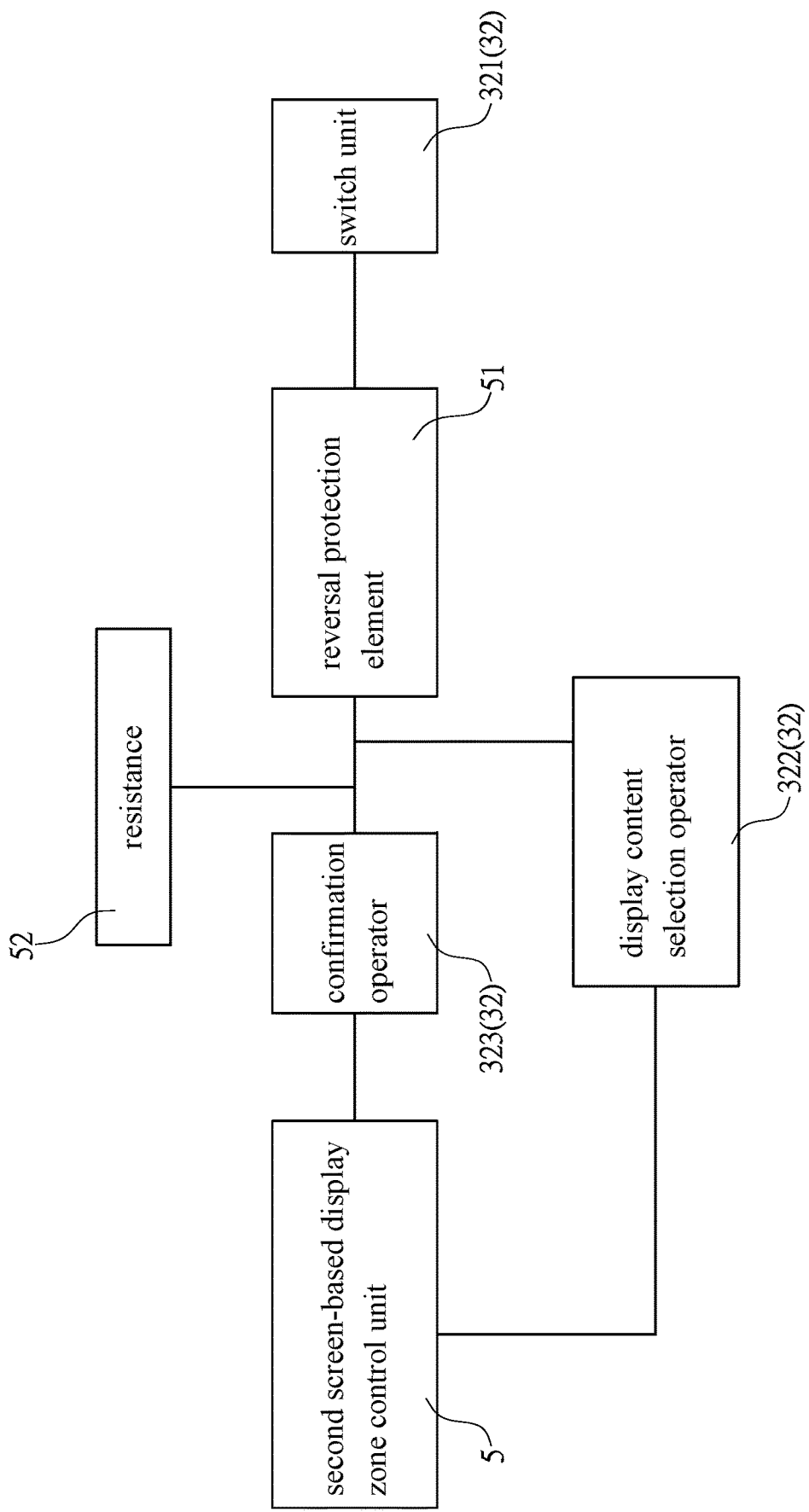

As shown in FIGS. 10, 11, and 12, to embody the screen-included dashboard 3 of the present invention, the mode switch operator 321 of the control operator module 32 is directly installed on an upper surface of the screen-included dashboard 3, and the screen-included dashboard 3 is provided with a second screen-based display zone control unit 5, where the second screen-based display zone control unit 5 comprises a logic circuit substrate, which, in a practical example, may share the same logic circuit substrate with the first embodiment so as to lower down the cost of the logic circuit substrate. The first screen-based display zone 311 or the second screen-based display zone 312 is electrically connected with the second screen-based display zone control unit 5, and the control operator module 32 is also electrically connected with the second screen-based display zone control unit 5. The mode switch operator 321 is electrically connected with the second screen-based display zone 312. A reversal protection element 51 is provided between the display content selection operator 322 and the confirmation operator 323 of the control operator module 32 and the mode switch operator 321 to protect the display content selection operator 322. A resistance element 52 further electrically connected between the confirmation operator 323 and the reversal protection element 51 such that damage the confirmation operator 323 or the display content selection operator 322 does not influence the other one to thus protect the confirmation operator 323 and the mode switch operator 321, thereby protecting the confirmation operator 323 or the display content selection operator 322. As such, the control operator module 32 may operate the mode switch operator 321 to control the first screen-based display zone 311 or the second screen-based display zone 312 for switching of display mode contents, and thus use the display mode content selection operator 322 to select desired display contents, and finally uses the confirmation operator 323 to cause the selected messages to display or to cause the selected control display mode contents to operate.

Figure 13:
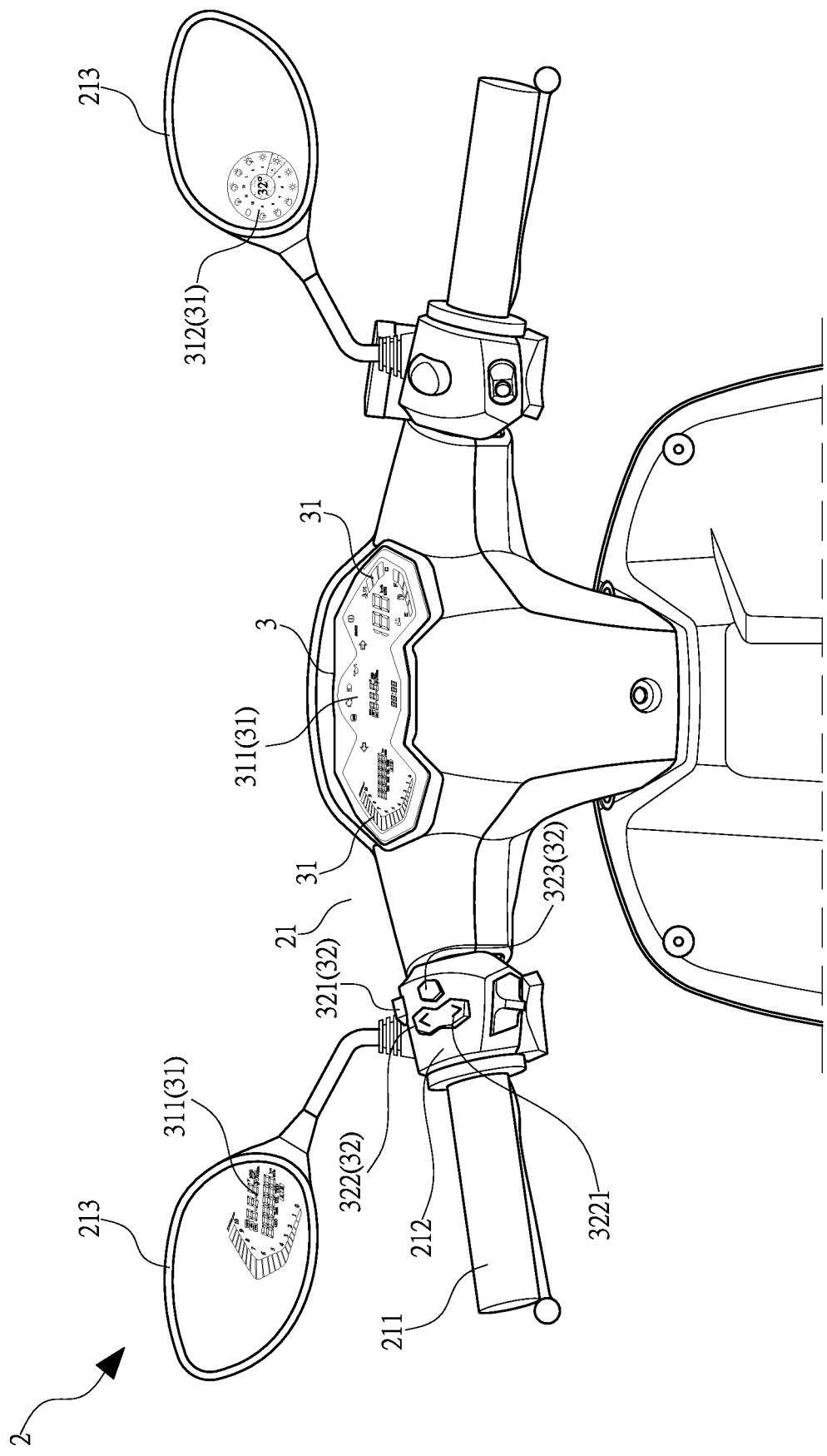
FIG. 13 shows a further embodiment of the vehicle dashboard according to the present invention.

As shown in FIG. 13, to embody the present invention, the first screen-based display zone 311 or the second screen-based display zone 312, all or one of them, is installed on a rearview mirror 213 of the steering unit 21 of the vehicle 2 to make observation of the rider easy.

The primary efficacy of the present invention is that the screen-included dashboard 3 comprises at least one screen-based display zone 31; a steering grip 211 of a steering unit 21 is provided with a control operator seat 212; and the control operator seat 212 is provided with a control operator module 32 that is operable to control the screen-based display zone 31 to switch different displaying messages, such that when a rider operates a first screen-based display zone 311 or a second screen-based display zone 312 for changing display mode contents, a hand of the rider does not need to move away from the steering grip 211 and direct operation may be conducted with fingers to achieve the purpose of changing display mode content to thereby, on the one hand, ensure riding safety and, on the other hand, well use the space of the control operator seat 212 of the steering grip 211.

The second efficacy of the present invention is that the control operator module 32 is electrically connected with the screen-included dashboard 3, and the control operator module 32 comprises a mode switch operator 321, a display content selection operator 322, and a confirmation operator 323, so as to ensure controllability of the screen-included dashboard 3.

The third efficacy of the present invention is that the screen-based display zone 31 at least comprises a first screen-based display zone 311 and a second screen-based display zone 312; the screen-included dashboard 3 comprises a first screen-based display zone control unit 4 and a second screen-based display zone control unit 5, wherein the first screen-based display zone 311 is electrically connected with the first screen-based display zone control unit 4 and the second screen-based display zone 312 is electrically connected with the second screen-based display zone control unit 5; the control operator module comprises a mode switch operator, wherein the mode switch operator is operable to control the first screen-based display zone and a second screen-based display zone for switching different message displaying modes, where the control operator module 32 comprises a mode switch operator 321, wherein the mode switch operator 321 is operable to control the first screen-based display zone 311 and a second screen-based display zone 312 for switching of different message displaying modes, so as to ensure controllability of the screen-included dashboard 3.

The fourth efficacy of the present invention is that the screen-included dashboard 3 comprises a first screen-based display zone control unit 4 and a second screen-based display zone control unit 5; the screen-based display zone 31 at least comprises a first screen-based display zone 311 and a second screen-based display zone 312, wherein the first screen-based display zone 311 is electrically connected with the first screen-based display zone control unit 4 and the second screen-based display zone 312 is electrically connected with the second screen-based display zone control unit 5; the mode switch operator 321 is electrically connected with the second screen-based display zone 312; a reversal protection element 41 is provided between a display content selection operator 322 and the mode switch operator 321 of the control operator module 32; a reversal protection element 51 is provided between the confirmation operator 323 and the mode switch operator 321 and a resistance element 52 is electrically connected between the confirmation operator 323 and the reversal protection element 51, such that the control operator module 32 operates the mode switch operator 321 to control the first screen-based display zone 311 or the second screen-based display zone 312 for switching of display mode contents, and then uses the display content selection operator 322 to select desired display mode contents, and finally uses the confirmation operator 323 to causes the selected messages to display or to cause the selected control display mode contents to operate, so as to ease controllability of the screen-included dashboard 3.

The fifth efficacy of the present invention is that an upper surface of the screen-included dashboard 3 is provided with a mode switch operator 321 of the control operator module 32; the mode switch operator 321 is electrically connected with the second screen-based display zone 312; a reversal protection element 51 is provided between the display content selection operator 322 and the confirmation operator 323 of the control operator module 32 and the mode switch operator 321 and a resistance element 52 is further electrically connected between the confirmation operator 323 and the reversal protection element 51, such that the control operator module 32 operates the mode switch operator 321 to control the first screen-based display zone 311 or the second screen-based display zone 312 for switching of display mode contents, and then uses the display content selection operator 322 to select desired display mode contents, and finally uses the confirmation operator 323 to cause the selected message displayed or to cause the selected control display mode contents to operate, so as to ease controllability of the screen-included dashboard 3.

The sixth efficacy of the present invention is that the first screen-based display zone control unit 4 and a second screen-based display zone control unit 5 are a logic circuit substrate, so as to lower down cost of the screen-included dashboard 3.

The seventh efficacy of the present invention is that the display content selection operator 322 is a top-bottom switchable operator, so as to ease the controllability of the control operator module 32.

The eighth efficacy of the present invention is that the display content selection operator 322 is a dual-button logic operator, so as to ease the controllability of the control operator module 32.

The ninth efficacy of the present invention is that the display content selection operator 322 comprises a plurality of selection operators, so as to ease the controllability of the control operator module 32.

The tenth efficacy of the present invention is that the screen-based display zone 31 at least comprises a first screen-based display zone 311 and a second screen-based display zone 312, wherein the first screen-based display zone 311 or the second screen-based display zone 312, all or one of them, is mounted to a rearview mirror 213 of the steering unit 21, so as to ease observation of the rider.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A vehicle dashboard structure, wherein a steering unit of a vehicle is provided with a screen-included dashboard; the screen-included dashboard comprises at least one screen-based display zone; the at least one screen-based display zone is operable to display different message modes; the steering unit comprises a steering grip; the steering grip is provided with a control operator seat; the control operator seat is provided with a control operator module that is operable to control the screen-based display zone to switch between different message displaying modes, wherein the control operator module is electrically connected with the screen-included dashboard, and the control operator module comprises a mode switch operator, a display content selection operator, and a confirmation operator.

2. The vehicle dashboard structure according to claim 1, wherein the at least one screen-based display zone at least comprises a first screen-based display zone and a second screen-based display zone; the screen-included dashboard comprises a first screen-based display zone control unit and a second screen-based display zone control unit, wherein the first screen-based display zone is electrically connected with the first screen-based display zone control unit and the second screen-based display zone is electrically connected with the second screen-based display zone control unit; the control operator module comprises the mode switch operator, wherein the mode switch operator is operable to control the first screen-based display zone and the second screen-based display zone for switching between different message displaying modes.

3. The vehicle dashboard structure according to claim 1, wherein the screen-included dashboard comprises a first screen-based display zone control unit and a second screen-based display zone control unit; the screen-based display zone at least comprises a first screen-based display zone and a second screen-based display zone, wherein the first screen-based display zone is electrically connected with the first screen-based display zone control unit and the second screen-based display zone is electrically connected with the second screen-based display zone control unit; the control operator module is electrically connected with the first screen-based display zone control unit and the second screen-based display zone control unit; the mode switch operator is electrically connected with the second screen-based display zone; a reversal protection element is provided between the display content selection operator and the mode switch operator of the control operator module; the reversal protection element is provided between the confirmation operator and the mode switch operator and a resistance element is further electrically connected between the confirmation operator and the reversal protection element such that the control operator module operates the mode switch operator to control the first screen-based display zone or the second screen-based display zone for switching of display mode contents, and then uses the display content selection operator to select desired display mode contents, and finally uses the confirmation operator to cause the selected message displayed or to cause the selected control display mode contents to operate.

4. The vehicle dashboard structure according to claim 3, wherein an upper surface of the screen-included dashboard is provided with the mode switch operator of the control operator module; the mode switch operator is electrically connected with the second screen-based display zone; a reversal protection element is provided between the display content selection operator and the confirmation operator of the control operator module and the mode switch operator and a resistance element is further electrically connected between the confirmation operator and the reversal protection element, such that the control operator module operates the mode switch operator to control the first screen-based display zone or for switching of display mode contents, and then uses the display content selection operator to select desired display mode contents, and finally uses the confirmation operator to cause the selected message displayed or to cause the selected control display mode contents to operate.

5. The vehicle dashboard structure according to claim 3, wherein the first screen-based display zone control unit and the second screen-based display zone control unit are a logic circuit substrate.

6. The vehicle dashboard structure according to claim 4, wherein the first screen-based display zone control unit and the second screen-based display zone control unit are a logic circuit substrate.

* * * * *